Aug. 13, 1929.  W. TAUBER  1,724,533
REFRIGERATING UNIT
Filed Oct. 25, 1926    2 Sheets-Sheet 1

Inventor
William Tauber
By Charles W. Hills Attys

Aug. 13, 1929.  W. TAUBER  1,724,533
REFRIGERATING UNIT
Filed Oct. 25, 1926   2 Sheets-Sheet 2
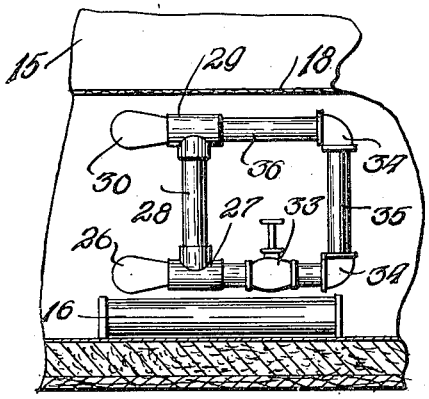
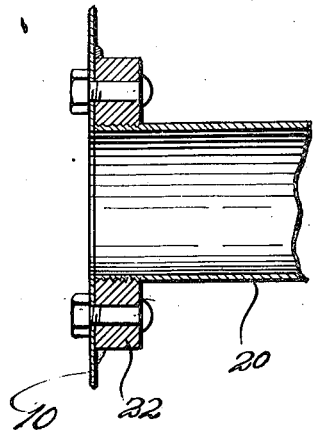
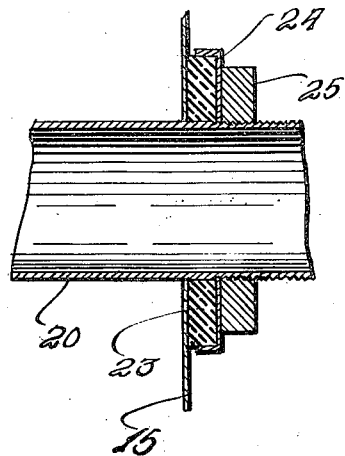
Inventor
William Tauber Patented Aug. 13, 1929.

1,724,533

UNITED STATES PATENT OFFICE.

WILLIAM TAUBER, OF CHICAGO, ILLINOIS.

REFRIGERATING UNIT.

Application filed October 25, 1926. Serial No. 143,838.

This invention relates to refrigerating units for such purposes as soda fountain use.

It is an object of this invention to provide an improved means for chilling the compartment for soda coils, bottles and individual items such as fruit pots. In accomplishing this object a brine circulating coil is connected to the brine tank provided for the ice cream can compartments and the soda and water coils are covered with water which is chilled by the low temperature produced by the brine circulation. The space above the soda coils is used as a bulk storage compartment instead of being filled with crushed ice and salt as in iced soda fountains.

It is also an object of this invention to provide a variable path for the brine circulation used for cooling the compartment to provide for additional cooling capacity in hot weather without over chilling or freezing the compartment in cool weather.

Other and further important objects of this invention will be apparent from the disclosures in the specification and accompanying drawings.

The invention (in a preferred form) is illustrated in the drawings and hereinafter more fully described.

On the drawings:—

Figure 3 is a side view of the brine coils with the walls of the compartment broken away.

Figure 4 is a sectional view of the attachment of the ends of coils to the brine tank.

Figure 5 is a sectional view of the stuffing box used where the coil enters the compartment.

As shown on the drawings:—

Figure 1:
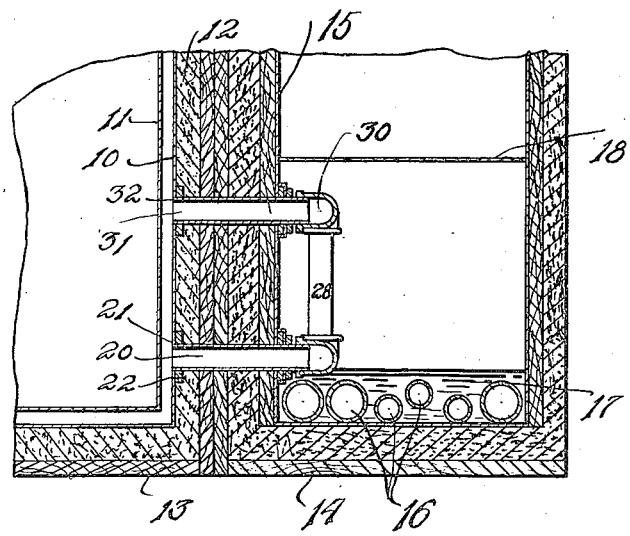
Figure 1 is a vertical section on the line 1—1 of Figure 2 showing the device of this invention in elevation.
Figure 2:
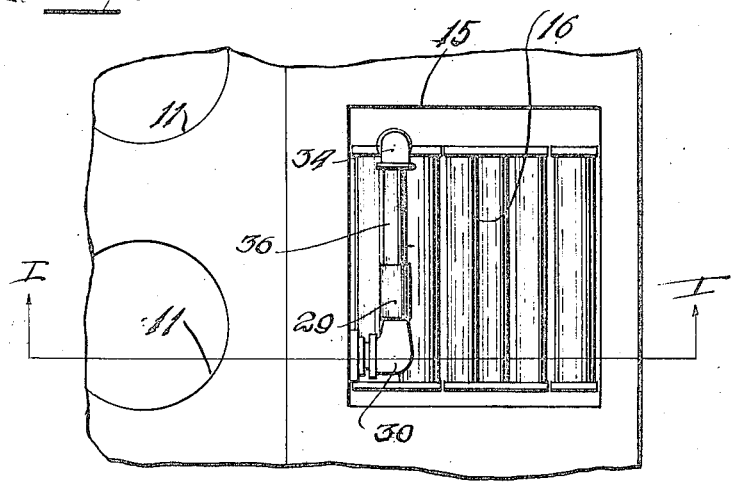
Figure 2 is a fragmentary plan view of a soda fountain compartment equipped with the brine circulating system.

A brine tank 10 is indicated in which are mounted a number of receptacles 11 to hold ice cream cans. In the usual soda fountain four, six or eight receptacles or "holes" are used to provide for a variety of flavors. The brine tank 10 is carefully insulated within an outer casing 13 and a second casing 14 forming a continuation of the casing 13 contains a similarly insulated compartment 15 which contains water and soda water cooling coils 16 at the bottom, the compartment preferably containing water 17 or some other good heat conducting medium of a depth sufficient to cover the cooling coils. The space above the water may be used for bulk storage of bottled or packaged goods, the extreme top being commonly used as a chilling compartment for fresh fruit flavors and sauces. In an ordinary ice cooled compartment only the extreme top and the cooling coils at the bottom are utilized, the middle space being occupied by crushed ice and salt.

The brine coil of this invention replaces the crushed ice with piping along the side of the compartment. The inlet pipe 20 to the coil is tapped into the side of the brine tank 10 at 21 and is secured thereto by a flange 22 bolted and soldered to the tank. The inlet 20 extends through the partition between the tank 10 and compartment 15 and is sealed to the wall of the latter by means of a rubber washer 23, inclosed by a metal cup 24 to prevent undue spreading, and compressed by a jam nut 25. An elbow 26 turns the layout parallel to the wall of the compartment, a pipe T 27 connecting by a riser 28 to a T 29, elbow 30 and the return pipe 31 leading into the brine tank at the flange 32, this pipe being mounted in a manner similar to the inlet pipe. The horizontal branch of the lower T 27 connects to a valve 33 and thence through the elbows 34, the riser 35 and a horizontal pipe 36 back to the horizontal branch of the upper T 29.

In the operation of this device when the maximum amount of chilling effect is desired in the compartment 15 the valve 33 is open and the brine from the tank 10 enters along the inlet pipe 20 and as it absorbs heat from the compartment the resulting rise in the brine temperature will cause the brine to flow up both risers 28 and 35 and thence back to the brine tank along the return pipe 31. If this chilling effect is too severe, partial or complete closure of the valve 33 reduces or stops brine flow into the riser 35 and reduces the cooling effect of the coil as a whole, the stagnant brine beyond the valve, when the valve is closed, having little effect as a cooling agent.

I am aware that many changes may be made, and numerous details of the construction may be varied through a wide range without departing from the principles of this invention, and I therefore do not purpose limiting the patent granted hereon, otherwise than necessitated by the prior art.

I claim as my invention:

In a cooling chamber for soda fountains, fluid-conducting conduits at the bottom of the chamber, a heat-conducting liquid having a level immediately above said conduits so that the greater portion of the chamber is available for the storage of food materials, brine-circulating pipes in said chamber and above the liquid, said brine-circulating pipes having parallel components, and valve means for varying the effective cooling area of said components.

In testimony whereof I have hereunto subscribed my name.

WILLIAM TAUBER.